United States Patent Office

3,276,881
Patented Oct. 4, 1966

3,276,881
NON-REFRIGERATED ICING CONTAINING POTASSIUM SORBATE AND GLUTATHIONE
John A. Troller, Cincinnati, Ohio, assignor to The Procter & Gamble Company, Cincinnati, Ohio, a corporation of Ohio
No Drawing. Filed Sept. 30, 1963, Ser. No. 312,351
1 Claim. (Cl. 99—139)

This invention relates to a method for potentiating and enhancing the antimicrobial activity of certain known preserving agents and, more particularly, to novel food additive compositions containing a known preserving agent and an auxiliary potentiating agent for increasing the antimicrobial effectiveness of the preserving agent.

As used herein, the term "preserving agent" is not used in its narrow sense to describe agents which absolutely prevent the growth of various groups of microorganisms but rather this term is used generically to include agents which retard or prevent the growth of microorganisms. "Microorganisms" and "microbial activity" are also used in their broadest sense to include a number of bacteria as well as molds and yeasts. "Food" and "food products" include not only nutriments suitable for human and/or animal consumption that are in solid form but also beverages and other substances that are commonly associated with nutriments.

A food preserving agent inhibits or retards the formation or development of various groups of microorganisms including yeasts, molds, and bacteria. Known preserving agents that are suitable for use in food products are generally effective against some molds at relatively low concentrations. However, substantially higher concentrations of these agents may be required before a satisfactory growth inhibition of microorganisms occurs.

For the safety of the consumer, food products must be protected against various groups of microorganisms including yeasts, molds and bacteria to insure the suitability of the food for consumption after a period of storage. Heretofore, protection of food against deterioration by all three classes of microorganisms has been generally provided by one or more of the common preserving agents. Of these agents, sorbic acid, benzoic acid, propionic acid, and their alkyl esters and their edible alkali metal and alkaline earth metal salts have been most widely used in food products. However, it is not always possible to utilize a sufficient amount of these agents to insure adequate and lasting protection. An effective amount may either exceed the approved level for food preserving agents or affect the flavor of the food adversely. With each of these preserving agents, it is essential that an acid pH be maintained since the preservative acid must exist in the undissociated form before the preserving agent has any substantial microbial activity.

It has been deemed particularly desirable to provide a method for potentiating and enhancing the antimicrobial activity of the common food preserving agents. Enhancing the protective power of these agents would increase the effectiveness of the preserving agents in food products wherein the approved maximum level of the preserving agent has been heretofore insufficient to control the growth of certain deleterious microorganisms. It would also permit the effective use in food products of unusually low levels of the common food preserving agents and it would also permit the pH of these products to be raised within the acid pH range without jeopardizing their protection against microbial attack. In addition, it would make it possible to protect fully those food products in which ineffective levels of preserving agents are now used because of the undesired detectable taste of these agents when used in larger quantities.

Auxiliary compounds used to potentiate and enhance the antimicrobial effectiveness of the food preserving agents should be non-toxic to humans and/or animals and should have no adverse effect upon the flavor of the food product at the levels at which they are employed. In addition, they should remain active for the period of time during which the food product is stored prior to use.

Accordingly, it is an object of this invention to provide a novel food additive composition, consisting of a known preserving agent and a potentiating agent, which is effective in inhibiting microbial growth in food systems.

It is another object of this invention to provide a method for potentiating and enhancing the antimicrobial activity of certain known food preserving agents.

Still another object of this invention is to provide a novel combination of a known food preserving agent and an auxiliary potentiating agent which has no adverse effect on the palatability of foodstuffs and beverages and which insures that the food product is protected against deterioration attributed to yeasts, molds, and bacteria until such time as it is ordinarily consumed.

In accordance with this invention, a novel food additive composition effective in inhibiting microbial growth in food products comprises about 0.03% to about 0.3% by weight of the food product in which it is used of a known preserving agent as hereinafter fully defined and about 0.01% to about 0.2% by weight of the food product of a sulfhydryl-containing potentiating agent having one or more sulfhydryl groups. A sulfhydryl group is the monovalent mercapto radical, —SH.

Any non-toxic sulfhydryl-containing compound can be employed in the compositions of this invention. Illustrative examples of preferred sulfhydryl-containing compounds include cysteine and its various acid salts such as, for example, cysteine hydrochloride and di-L-cysteine sulfate. Other preferred compounds include thioglycolic acid and its sodium and potassium salts. Glutathione is a particularly preferred compound because of its relatively bland flavor. Other specifically useful potentiating agents include: thioctic acid, homocysteine, sodium thioglycolate, potassium thioglycolate, thioglycerol, thiolactic acid, thiomalic acid and thiosorbitol. Thiol enriched materials such as "Thiol-gel," a thiol enriched protein substance, are also useful potentiating agents.

The preserving agent used in conjunction with the auxiliary potentiating agent can be sorbic acid, benzoic acid, or a saturated or 2,3-unsaturated fatty acid having from 8 to 11 carbon atoms, or any methyl or ethyl ester or salt thereof. Suitable salts include the alkali metal and alkaline earth metal salts such as sodium, potassium, magnesium and calcium. These compounds all possess a recognizable degree of antimicrobial activity. Sorbic acid and potassium sorbate are particularly preferred compounds because of their high degree of antimicrobial activity in an acid medium and their comparatively less detectable taste.

Saturated lower aliphatic carboxylic acids, such as propionic acid and diacetic acid and their esters and salts, are not potentiated in the same manner as the other known preserving agents enumerated above. For this reason they are not included within the scope of this invention.

The cooperative effect between the preserving agent and the potentiating agent is not clearly understood except that it is apparent that the sulfhydryl group in the potentiating agent is responsible for the enhanced antimicrobial activity of the preserving agent.

The effectiveness of the novel combinations of this invention in controlling the growth and development of microorganisms responsible for the deterioration of food products is illustrated by the results obtained in the following in vitro tests with a strain of *Aspergillus niger*, one of the most common food spoilage molds. Substantially similar results have been observed with other molds such as *Penicillium citrinium*, *Aspergillus sydowi*, and *Aspergillus repens*; a bacterium, *Micrococcus candidus*; and, a yeast, *Saccharomyces cerevisiae*.

In conducting the test with *Aspergillus niger*, an agar medium was first prepared having the following composition.

| Substance: | Grams/liter of water |
|---|---|
| Asparagine monohydrate | 5.0 |
| Glucose | 10.0 |
| $MgSO_4 \cdot 7H_2O$ | 0.25 |
| $KH_2PO_4$ | 0.25 |
| $FeSO_4 \cdot 7H_2O$ | 0.001 |
| "Difco" agar | 20.0 |

The pH of the agar medium was adjusted to 5.0 with 0.1 N NaOH and sterilized with steam at 121° C. for 15 minutes. The medium was then poured into Petri dishes and allowed to cool to room temperature before being stab inoculated with a bacteriological inoculating needle previously dipped in a saline suspension of *Aspergillus niger* spores. The length of time required for the commencement of growth was visually determined and a measurement of the rate of enlargement of the mold colony was also noted. These observations were made on Petri dishes containing the following preserving agents and potentiating agents and on Petri dishes containing the same percentage of preserving agent alone. The results were compared and are reported below as the percent increase in relative inhibition of mold growth.

| Preserving agent+potentiating agent: | Percent increase in relative inhibition |
|---|---|
| 0.1% sorbic acid+0.05% cysteine | 94 |
| 0.1% sorbic acid+0.1% cysteine | 82 |
| 0.1% potassium sorbate+0.1 potassium thioglycolate | [1] 100 |
| 0.1% potassium sorbate+0.05% sodium thioglycolate | [1] 100 |
| 0.1% sorbic acid+0.05% glutathione | 79 |
| 0.1% potassium sorbate+0.1% glutathione | [1] 100 |
| 0.05% potassium sorbate+0.05% cysteine hydrochloride | 25 |
| 0.05% potassium sorbate+0.05% potassium thioglycolate | 15 |
| 0.05% sorbic acid+0.1% sodium thioglycolate | [1] 100 |
| 0.05% methyl benzoate+0.1% sodium thioglycolate | [1] 100 |
| 0.05% methyl benzoate+0.05% sodium thioglycolate | [1] 100 |
| 0.075% sorbic acid+0.05% di-L-cysteine sulfate | [1] 100 |
| 0.075% sorbic acid+0.025% cysteine | [1] 100 |
| 0.1% 2,3-decenoic acid+0.05% cysteine | 40 |
| 0.1% nonanoic acid+0.05% cysteine hydrochloride | 50 |

[1] Denotes equal to or greater than 100.

The novel food additive compositions of this invention can be used in the following food products in which food preserving agents have been shown to have utility: meats; fish; cheese (particularly cottage cheese); milk; ice cream; fruit juices such as apple juice, orange juice and tomato juice; corn syrup; maple syrup; fruits including dried, fresh, and citrus fruits; vegetables; beer; wine; farinaceous-containing products such as bread (when the preserving agent is introduced in a manner which does not interfere with the proofing of the dough) and cake; butter; oleomargarine and butter substitutes; vegetable and animal oils and fats; candies; icings and toppings.

Any suitable and convenient technique can be employed to protect food products from microbial deterioration which insures an intimate association of the novel food additive compositions of this invention with the food product to be protected. Thus, the preserving agent and the potentiating agent can be incorporated in the food product. When the food product is prepared in a completely sterile manner, the product can be protected by coating the surface of the prepared product. This coating can be applied by dipping the food product in a solution containing the preserving and potentiating agents. Alternatively, a solution of these agents can be washed, sprayed, or otherwise applied to the surface of the food product. A solid dusting compound can be composed by using a dry mixture of the preserving agent and the potentiating agent either alone or in admixture with another ingredient such as flour or milk solids. These mixtures can be either dusted on the surface of a sterile food product or, if mixed with an ingredient of the food product, incorporated in the product itself. The preserving agent and the potentiating agent can also be dispersed in other materials, particularly vegetable oils and fats, intended for use in food products. In addition, the novel food additive compositions can be effectively incorporated in or coated onto the surface of wrapping materials used to intimately surround food products which are to be protected.

Although any of the above-enumerated methods for protecting these food products can be employed, the following illustrative methods are most convenient: The preserving agent and the potentiating agent are dissolved in fruit juice, beer, wine or other substantially liquid products. In the instance of milk, it may be more desirable to utilize the protection on the wall of the paper milk carton by coating the carton with a solution of the preservative and potentiating agent. A product such as bread can be protected by including the food additive compositions of this invention in the dough in such a manner that they do not interfere with the biological activity of the yeast or by applying the protective agents to the bread wrapper. Articles such as fruits and vegetables can be washed in, dipped in or sprayed with a solution containing the preserving agent and potentiating agent, or these articles may be incorporated onto the material utilized for wrapping these products.

It is generally desirable to insure the required protection of the food product to use the maximum possible level of the preserving agent and from about 0.05% to about 0.15% by weight of the food product of the sulfhydryl-containing potentiating agent. This is a preferred amount of potentiating agent since it provides the desired enhancement in the antimicrobial activity of the preserving agent without adding any detectable taste to the food product.

The unusual effectiveness of the compositions of this invention have been demonstrated in non-refrigerated icings which are particularly susceptible to attack by microorganisms. This test can be substantially duplicated by the use of other products which are equally susceptible to deterioration such as, for example, bread and cheese. In this particular example, a chocolate icing product having a pH of 6.75 and having the following composition was used.

| Ingredients: | Percent by weight |
|---|---|
| Water | 18.6 |
| Carragheen gum | 0.09 |
| Powdered sugar (sucrose) | 52.15 |
| Non-fat milk solids | 2.3 |
| Dextrose | 4.5 |
| Sodium chloride | 0.3 |
| Shortening | 15.0 |
| Flavor | 0.06 |
| Cocoa | 7.0 |
| | 100.00 |

To one batch of the above product, 0.05% by weight of the icing of sorbic acid was added. The same weight percentage of sorbic acid plus 0.01% by weight of icing of cysteine hydrochloride was added to a second batch. Nine 5 gram samples of the first batch containing only the sorbic acid were placed in nine individual 6-dram snap-on vials and the sealed vials placed in a plastic bag. Sixteen 5-gram samples of the second batch containing sorbic acid and cysteine hydrochloride were placed in 16 similar vials and stored in the same manner in a second plastic bag. These plastic bags were kept at room temperature for a total of 220 days. At the end of this period, the individual vials were inspected. All nine of the vials containing icing having only the sorbic acid preserving agent were spoiled as evidenced by the visual presence of mold. Six of the sixteen samples containing sorbic acid and cysteine hydrochloride showed no visible evidence of spoilage; the remaining examples had only small traces of surface mold.

Whereas this invention is directed primarily to the protection of food products suited for human and/or animal consumption, it will be apparent that the invention is also applicable to other uses where protection against microbial activity is desired. The compositions of this invention can be used to control the growth of microorganisms in such non-edible substances as cosmetics, lotions, ointments, bandages, and sterile dressings.

Any of the disclosed preserving agents can be combined with a sulfhydryl-containing potentiating agent to produce a composition suitable for any of the uses herein described by combining these agents in a ratio of from about 0.15 to 1 to about 30 to 1 of the preserving agent to the potentiating agent. These compositions can then be employed in one of the previously disclosed methods which is best suited to providing the desired antimicrobial protection of the food product or other substance.

It will be apparent to those skilled in the art that variations and modifications of the present invention can be made upon study of the foregoing disclosure. Such variations and modifications are intended to be within the spirit and scope of this invention as defined in the appended claim.

What is claimed is:

A non-refrigerated icing composition susceptible to attack by microorganisms comprising sugar, water, and shortening and containing from about 0.03% to about 0.3% potassium sorbate as a preserving agent and from about 0.01% to about 0.2% of a sulfhydryl-containing compound capable of potentiating the activity of the preserving agent, the sulfhydryl-containing compound being glutathione.

References Cited by the Examiner

UNITED STATES PATENTS

| | | | |
|---|---|---|---|
| 2,379,294 | 6/1945 | Gooding | 99—224 |
| 2,456,937 | 12/1948 | Gyorgy et al. | 96—163 X |
| 2,711,976 | 6/1955 | Castellani | 99—163 X |
| 2,860,055 | 11/1958 | Jansen | 99—150 X |
| 2,979,410 | 4/1961 | Parlour | 99—150 X |
| 3,038,810 | 6/1962 | Akerboom et al. | 99—163 X |
| 3,053,666 | 9/1962 | Henika | 99—90 |

OTHER REFERENCES

Braverman: "Introduction to the Biochemistry of Foods," 1963, Elsevier Pub. Co., New York, pp. 246–247.

A. LOUIS MONACELL, *Primary Examiner.*

JOSEPH M. GOLIAN, *Assistant Examiner.*